United States Patent [19]

Marrion

[11] Patent Number: 5,278,249
[45] Date of Patent: Jan. 11, 1994

[54] COATING COMPOSITIONS

[75] Inventor: Alastair R. Marrion, Northumberland, United Kingdom

[73] Assignee: Courtaulds Coatings (Holdings) Limited, United Kingdom

[21] Appl. No.: 778,899

[22] PCT Filed: Jul. 12, 1990

[86] PCT No.: PCT/GB90/01075
§ 371 Date: Jan. 10, 1992
§ 102(e) Date: Jan. 10, 1992

[87] PCT Pub. No.: WO91/00894
PCT Pub. Date: Jan. 24, 1991

[30] Foreign Application Priority Data

Jul. 13, 1989 [GB] United Kingdom ............... 8916039

[51] Int. Cl.$^5$ .............................................. C08F 8/32
[52] U.S. Cl. ................................. 525/380; 428/500; 525/207; 525/223; 525/327.6; 525/375; 525/382
[58] Field of Search ............... 525/327.6, 207, 380; 428/500

[56] References Cited

U.S. PATENT DOCUMENTS 4,452,948 6/1984 Marrion et al. .................... 525/207
4,798,745 1/1989 Martz et al. ...................... 427/407.1
4,946,744 8/1990 Shalati et al. ...................... 428/500

FOREIGN PATENT DOCUMENTS 259172 3/1988 European Pat. Off. .
353899 2/1990 European Pat. Off. .

OTHER PUBLICATIONS

Liu et al., *Journal of Polymer Science: Part A: Polymer Chemistry*, vol. 26, 3015-3029 (1988).

Derwent Patent Abstract 83-829562 (an abstract of Japanese Patent Application 58-179271).

*Primary Examiner*—Joseph L. Schofer
*Assistant Examiner*—Fred Zitomer
*Attorney, Agent, or Firm*—Eckert Seamans Cherin & Mellott

[57] ABSTRACT

A curable coating composition comprises a hydroxy-functional component (A) having at least two hydroxy groups per molecule and an anhydride-functional component (B) having at least two carboxylic acid anhydride groups per molecule. At least one of the components (A) and (B) is a film-forming polymer. The coating composition contains amidine groups for accelerating the curing reaction between the hydroxy groups of component (A) and the anhydride groups of component (B). The amidine groups are present in the molecule of either of the components (A) or (B) and/or are present in the form of a separate compound containing an amidine group. The component or compound containing an amidine group generally has the formula

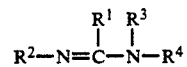

in which $R^1$ represents hydrogen, or an organic group attached through a carbon atom, or an amine group which can be substituted, or a hydroxy group or etherified hydroxy group; $R^2$ and $R^3$ each independently represent hydrogen or an organic group attached through a carbon atom or are joined to one another to form (with the linking —N=C—N—) a heterocyclic ring; and $R^4$ represents hydrogen, an organic group attached through a carbon atom, or a hydroxyl group which can be etherified. Preferably, $R^2$ and $R^3$ are joined to form an imidazoline, imidazole, tetrahydropyrimidine, dihydropyrimidine or pyrimidine ring.

14 Claims, No Drawings

COATING COMPOSITIONS

FIELD OF THE INVENTION

This invention relates to a curable coating composition based on a hydroxy-functional component and an anhydride-functional component.

BACKGROUND OF THE INVENTION

U.S. Pat. No. 4,452,948 describes a coating composition suitable for use as a glossy pigmented coating for a rigid substrate, particularly where hardening of the coating at ambient temperatures is required, for example as a vehicle refinishing paint. The coating composition comprises a hydroxy component having at least two free hydroxy groups per molecule and an anhydride component having at least two cyclic carboxylic acid anhydride groups per molecule, at least one of these components being a film-forming polymer. The composition also includes a catalytically effective amount of amine groups, preferably present on the hydroxy component, for accelerating the curing reaction between the hydroxl groups and the anhydride groups.

European Patent Application 259172 describes a coating composition comprising an anhydride polymer containing at least two cyclic carboxylic acid anhydride groups and a polymer containing at least two functional groups reactive with anhydride groups. These reactive groups are selected from hydroxyalkylamino, hydroxyalkoxyalkylamino, hydroxy-substituted acyloxyalkylamino, hydroxy-substituted polyacyloxyalkylamino, mercaptoalkylamino and oxazolidino groups. One of the polymers comprises a flexible polymer chain selected from polyether, polyester, silicone, diene polymer, hydrogenated diene polymer, polyurethane, polyisobutylene and polyacrylate chains. The functional groups characteristic of that polymer are each present as a terminal group at the end of a flexible polymer chain. The cured coatings have increased resistance to impact and abrasion.

U.S. Pat. No. 4,798,745 describes a coating composition comprising a hydroxy component having at least two free hydroxy groups per molecule and an anhydride component having at least two carboxylic anhydride groups per molecule used in amounts to provide a ratio of equivalents of hydroxy groups to equivalents of anhydride groups of 3:1 to 1:3. The anhydride component is a copolymer of at least 11% by weight of an ethylenically unsaturated anhydride with a vinyl comonomer such as styrene which is used in a molar proportion of at least 1:1 with respect to the unsaturated anhydride.

Liu et al in J. Polymer Science, Part A: Polymer Chemistry, 26, pages 3015 to 3029 (1988), describe the preparation of 1,1'-bis(2-hydroxyethyl)-2,2'-biimidazole and its use in synthesising a series of new polyurethanes based on aromatic diisocyanates. Derwent Patent Abstract 83-829562 (an abstract of Japanese Patent Application 58-179271) describes a coating composition comprising a reaction product of a bis(hydroxy-imidazoline) and an epoxy resin, the product being neutralised with a volatile acid.

SUMMARY OF THE INVENTION

A coating composition according to the invention comprises (A) a hydroxy-functional component having at least two hydroxy groups per molecule and (B) an anhydride-functional component having at least two carboxylic anhydride groups per molecule, at least one of the components (A) and (B) being a film-forming polymer, and is characterised in that the coating composition contains amidine groups for accelerating the curing reaction between the hydroxy groups of component (A) and the anhydride groups of component (B), the amidine groups being present as a substituent group in component (A) or (B) and/or being present in the form of a separate compound containing an amidine group.

By an amidine group we mean a group of the formula

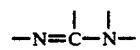

DETAILED DISCLOSURE

The component or compound containing an amidine group can for example have the formula

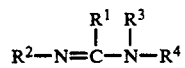

in which $R^1$ represents hydrogen, an organic group attached through a carbon atom, an amine group which can be substituted, for example by an optionally substituted hydrocarbyl group having up to 6 carbon atoms, or a hydroxy group which can be etherified, for example with an optionally substituted hydrocarbyl group having up to 8 carbon atoms; $R^2$ and $R^3$ each independently represent hydrogen or an organic group attached through a carbon atom or are joined to one another to form (with the linking —N=C—N—) a heterocyclic ring; and $R^4$ represents hydrogen, an organic group attached through a carbon atom or a hydroxy group which can be etherified, for example with an optionally substituted hydrocarbyl group having up to 8 carbon atoms. When $R^1$ or $R^4$ is an organic group it can for example contain 1 to 40 carbon atoms or can be a polymeric group, for example having a molecular weight of 500 to 50,000.

Particularly preferred catalytic amidine groups are those in which the groups $R^2$ and $R^3$ are joined to form (with the linking —N=C—N—) a heterocyclic ring, for example an imidazoline (which is most preferred), imidazole, tetrahydropyrimidine, dihydropyrimidine or pyrimidine ring. Acyclic amidines and guanidines can alternatively be used.

The coating compositions of the invention can generally be cured at ambient temperature to a hard, solvent-resisting coating. The cured coating shows outstanding resistance to hydrolysis, for example under humid conditions, and is superior to the coatings of U.S. Pat. Nos. 4,452,948 and 4,798,745 and European Patent Application 259172 in this respect.

According to one preferred aspect of the invention, the amidine groups are present in the molecule of the hydroxy-functional component (A). The hydroxy-functional component (A) can for example be represented by the formula:

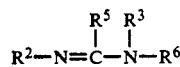

in which $R^2$ and $R^3$ have the meaning given above, $R^5$ and $R^6$ each independently represent hydrogen or an organic group (e.g. as above) attached through a carbon atom, the groups $R^2$, $R^3$, $R^5$ and $R^6$ containing as substituents a total of at least two alcoholic hydroxy groups.

The hydroxy-functional component (A) can be a polymer or a non-polymeric compound. Examples of hydroxy-functional polymers which contain catalytic amidine groups are those having hydroxyalkyl-substituted amidine, for example imidazoline, groups attached to a polymer chain. The polymer can for example contain two hydroxyalkyl-substituted amidine groups at the ends of a polymer chain or may contain three or more hydroxyalkyl-substituted amidine groups. The group $R^5$ in the above formula can for example be a polymer chain tipped with another hydroxyalkyl-substituted amidine group, with the group $R^6$ being a hydroxyalkyl group. Non-polymeric compounds can also be of this type, in which the hydroxyalkyl-substituted amidine groups are attached to a divalent, trivalent or higher valency organic radical at both ends of an alkylene chain, preferably of at least four carbon atoms, optionally containing an ether, ester, amide or arylene linkage. Further examples of non-polymeric compounds are those in which the groups $R^5$ and $R^6$ are both hydroxyalkyl. In either case any or all of the hydroxyalkyl groups preferably contain 1 to 20 carbon atoms and can contain one or more ether, ester or amide linkages.

A hydroxy-functional component (A) containing catalytic amidine groups can for example be a polymer or compound containing at least two hydroxyalkyl-substituted imidazoline groups, for example of the formula

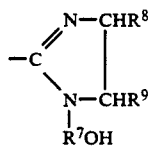

where $R^7$ represents a divalent organic group attached through carbon atoms, for example an alkylene radical which preferably contains 1 to 20 carbon atoms and may contain one or more ether, ester or amide linkages, and $R^8$ and $R^9$, which may be the same or different, each represent hydrogen or a lower alkyl group, for example of 1 to 3 carbon atoms. Such hydroxy-functional materials can be prepared by reacting a polymer or compound having at least two carboxylic acid groups with an optionally substituted N-hydroxyalkyl ethylene diamine, for example of the formula

$$H_2N-CHR^8-CHR^9-NH-R^7OH$$

A preferred diamine is N-hydroxyethyl ethane diamine. The reaction is preferably carried out in an organic solvent such as an aromatic or aliphatic hydrocarbon, for example xylene, or a ketone or ester, with removal of water during the reaction. Water can be removed by carrying out the reaction at a temperature above the boiling point of water and/or by using a solvent which forms an azeotrope with water and removing the water by distillation. Hydroxyalkyl-substituted tetrahydropyrimidine groups can similarly be produced by the reaction of a carboxylic acid-functional material with a hydroxyalkyl-substituted propane-1,3-diamine.

The compound containing at least two carboxylic acid groups can for example be a dicarboxylic acid, preferably of 4 to 40 carbon atoms, such as adipic, azelaic, succinic, sebacic, isophthalic, terephthalic, cyclohexanedicarboxylic or dodecanedicin acid, or a fatty acid dimer such as those sold under the trade marks "Pripol" or "Versadyme". Preferred components (A) containing hydroxy-substituted imidazoline groups thus have the formula:

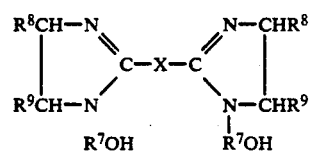

in which $R^7$, $R^8$ and $R^9$ have the above meanings and X represents an alkylene chain of at least 4 carbon atoms optionally containing an ether, ester, imide or arylene linkage.

A preferred carboxylic acid-functional polymer for reaction with an N-hydroxyalkyl ethylene diamine can for example be a polyester, polyether, polyamide, acrylic polymer, carboxyl-tipped diene polymer such as a copolymer of butadiene with acrylonitrile and/or styrene, or a carboxyl-tipped polyisobutylene, most preferably a telechelic polymer having its carboxylic acid groups as terminal groups. One particularly preferred type of carboxy-tipped polymer is a polyamide derived from a diamine and an excess of a long-chain dicarboxylic acid, for example a fatty acid dimer or an alpha,omega-dicarboxylic acid having at least 8 carbon atoms such as 1,12-dodecanedioic acid. A shorter-chain acid such as adipic acid can be used in conjunction with the long-chain dicarboxylic acid if, desired. The diamine used to form the polyamide is for example piperazine or ethane diamine. Part of the diamine can be replaced by a triamine, for example diethylene triamine, to form a branched polyamide containing more than two carboxylic acid groups per molecule. Such polyamides lead to cured coatings having superior mechanical properties such as impact and abrasion resistance. An alternative carboxylic acid-functional polymer is a reaction product of caprolactam and an anhydride-functional polymer, for example an anhydride-functional acrylic polymer, containing groups of the formula:

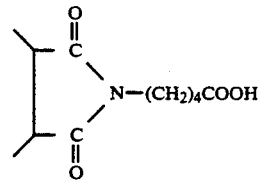

The conditions for carrying out this reaction are described in U.S. Pat. No. 4,600,770.

The bis- or poly-(1-hydroxyethylimidazoline) formed by reaction of a bis- or poly-carboxylic acid with N-hydroxyethyl ethane diamine can if desired be reacted with a lactone, for example epsilon-caprolactone, or an alkylene oxide, for example ethylene oxide or propylene oxide, to provide a hydroxy-functional component (A) containing extended groups $R^7OH$ containing ester or ether linkages. In general, hydroxy-functional components containing such ester- or ether-extended groups $R^7OH$ are less reactive than the N-hydroxyethyl compounds, giving increased pot life on mixing of the components (A) and (B), but also a longer time for the coating to cure on the substrate.

The hydroxy-functional component (A) can alternatively be a dihydroxyimidazoline, that is a compound containing at least two hydroxy-substituted radicals attached to one imidazoline ring. The dihydroxyimidazoline can for example be a 1,2-disubstituted imidazoline of the formula:

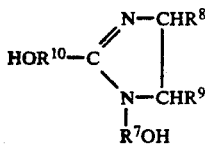

where the groups $R^7$, $R^8$ and $R^9$ are defined as above and $R^{10}$ represents a divalent organic group, for example an alkylene or alkenylene group preferably containing up to 20 carbon atoms and in the case of an alkylene group optionally containing one or more ether, ester or amide linkages.

Such compounds can for example be produced by reaction of an N-hydroxyalkyl ethylene diamine derivative such as N-hydroxyalkyl ethane diamine with a hydroxy-substituted carboxylic acid such as 12-hydroxystearic acid, ricinoleic acid or omega-hydroxycaproic acid, or a lactone such as epsilon-caprolactone or delta-valerolactone. The reaction is preferably carried out in an organic solvent with removal of water.

In general, compounds of the formula:

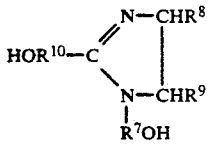

contain two hydroxy groups of different reactivity. The hydroxyalkyl-substituted imidazoline compound derived from N-hydroxyethyl ethane diamine and epsilon-caprolactone, for example, has the formula:

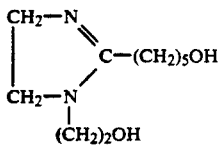

The hydroxyethyl group attached in the 1-position, where the hydroxy is beta- to the nitrogen atom of the imidazoline ring, is substantially more reactive than the hydroxyalkyl group attached in the 2-position. This difference in reactivity can be used to form hydroxy-functional components (A) containing two or more

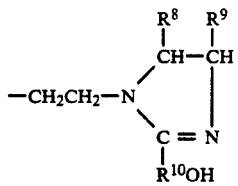

groups by reacting the hydroxyimidazoline with a compound or polymer containing two or more groups reactive with hydroxy groups, for example carboxylic acid, anhydride or acid chloride groups, or isocyanate groups. The reaction should preferably be carried out with an amount of the carboxylic or isocyanate reagent equivalent to only half the hydroxy groups of the dihydroxyimidazoline, or with the dihydroxyimidazoline in a larger excess. The dihydroxyimidazoline can for example be reacted with a dicarboxylic acid such as adipic acid, a tricarboxylic acid or anhydride such as trimellitic anhydride, or a polyester such as a tricarboxylic acid-functional polyester prepolymer formed from a trihydroxy compound such as trimethylolpropane and an excess of adipic acid, optionally extended with caprolactone.

An alternative dihydroxyimidazoline can be formed by the reaction of an N-(aminoalkyl)-substituted ethylene diamine, for example diethylene triamine, with a hydroxy-substituted carboxylic acid or a lactone such as epsilon-caprolactone. The reaction product has the formula:

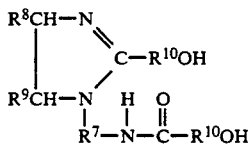

where each radical $R^{10}$ is defined as above ($R^{10}$ being $-(CH_2)_5-$ when epsilon-caprolactone is used).

Hydroxy-substituted imidazolines can also be prepared from nitriles by reaction with an N-hydroxyalkyl ethylene diamine, for example N-hydroxyethyl ethane diamine. The reaction is preferably carried out in an organic solvent using sulphur or a sulphur compound, for example a salt of a sulphur-containing amino acid, for example cysteine or cystine hydrochloride, as catalyst, as disclosed in British Patent 1332959. Polymers containing hydroxy-substituted imidazoline groups can for example be prepared from acrylonitrile polymers by reaction with N-hydroxyethyl ethane diamine. Alternatively, a polymer containing nitrile and hydroxy groups, for example a copolymer of acrylontrile and a hydroxyalkyl acrylate or methacrylate such as hydroxyethyl acrylate or hydroxyethyl methacrylate, optionally with one or more ethylenically unsaturated comonomers, can be reacted with ethane diamine or a substituted ethylene diamine such as N-methyl ethane diamine to produce a polymer containing imidazoline groups and hydroxy groups.

Further examples of a hydroxy-functional component (A) containing amidine groups in its molecule are copolymers of an ethylenically unsaturated amidine compound and an ethylenically unsaturated hydroxy compound prepared by addition polymerisation using a free radical initiator such as a peroxide or azo compound.

Polymerisation is usually carried out in an organic solvent. Examples of ethylenically unsaturated amidine compounds are N-vinyl imidazole, N-vinyl imidazoline, 2-vinyl imidazole and 2-vinyl imidazoline. Examples of ethylenically unsaturated hydroxy compounds are hydroxyalkyl esters of an ethylenically unsaturated carboxylic acid such as 2-hydroxyethyl acrylate or methacrylate or 2- or 3-hydroxypropyl acrylate or methacrylate, or compounds containing an ether linkage or further ester linkage such as 2-(2-hydroxyethyl)ethyl acrylate or methacrylate or a reaction product of a hydroxyalkyl acrylate or methacrylate with caprolactone. The copolymer preferably comprises 5 to 50% by weight, most preferably 10 to 50% by weight, of units of the hydroxy-functional monomer; and 2 to 50% by weight, most preferably 4 to 20% by weight, of the units of the amidine-functional monomer, and generally also contains units of at least one olefinically unsaturated comonomer. Examples of olefinically unsaturated comonomers which can be copolymerised with the ethylenically unsaturated hydroxy and amidine compounds are acrylic esters such as butyl acrylate or methacrylate, methyl methacrylate or acrylate, ethyl acrylate or methacrylate, propyl acrylate or methacrylate, n-hexyl acrylate or methacrylate, isopropyl acrylate or methacrylate, t-butyl acrylate or methacrylate, 2-ethylhexyl methacrylate or acrylate, cyclohexyl acrylate or methacrylate, 2,2,5-trimethylcyclohexyl acrylate or methacrylate or isobornyl acrylate or methacrylate, acrylonitrile, methacrylonitrile and vinyl compounds such as styrene, vinyl acetate or vinyl chloride.

The copolymer can also contain a polyester segment, for example a graft copolymer of acrylic monomers onto an unsaturated polyester. The acrylic monomers are preferably selected from those above and include a hydroxy-containing monomer such as a hydroxy-alkyl acrylate or methacrylate and an amidine-functional monomer such as N-vinylimidazole. The polyester segment is preferably a low molecular weight (below 1000) polyester derived from a polyol such as ethylene glycol, propylene glycol or trimethylolpropane and an acid or anhydride such as phthalic anhydride, isophthalic acid or adipic acid with a minor amount of an unsaturated acid or anhydride such as maleic anhydride. The polyester generally forms 50% or less by weight of the graft copolymer, for example 5–25% by weight.

The hydroxy-functional component (A) of the coating composition can be a blend of a hydroxy-functional component containing at least one amidine group, as described above, and a hydroxy-functional component containing at least two hydroxy groups but containing no amidine or amine groups. For example, a compound or polymer containing at least two hydroxy substituents, can be used in conjunction with a hydroxy-functional polymer such as a copolymer of a hydroxyalkyl acrylate or methacrylate. Such a blend may give a coating of improved mechanical properties compared to a coating formed from a hydroxy-functional polymer and an amine catalyst cured with the same anhydride-functional component (B). The blend may also allow the use of a coating composition with higher solids content at an acceptable viscosity for application. Alternatively, a copolymer containing units of an amidine-functional monomer such as N-vinyl imidazole and units of a hydroxy-functional monomer such as a hydroxyalkyl acrylate or methacrylate can be used in conjunction with a hydroxy-functional polymer containing no amidine or amine groups. The hydroxy-functional polymer containing no amidine or amine groups is preferably a copolymer of 5 to 80% by weight, most preferably 10 to 50% by weight, of units of a hydroxyalkyl ester of an ethylenically unsaturated carboxylic acid with 20 to 95% by weight, most preferably 50 to 90% by weight, of an olefinically unsaturated comonomer as described above. It may contain a polyester segment as described above.

Alternative hydroxy-functional polymers containing no amidine or amine groups which can be used in conjunction with a compound or polymer containing hydroxy groups and at least one amidine group as component (A) of the coating compositions are hydroxy-functional polyesters. Such hydroxy-functional polyesters can be prepared by the reaction of one or more diols, triols or higher polyols with a polycarboxylic acid, generally a dicarboxylic acid, or an anhydride thereof. Examples of suitable polyols are ethylene glycol, propylene glycol, 1,3-propane diol, 1,2-butane diol, 1,4-butane diol, 2,2,4-trimethyl-1,3-pentane diol, 1,6-hexane diol, neopentyl glycol, 1,4-cyclohexanediol, 1,4-cyclohexanedimethanol, diethylene glycol, dipropylene glycol, trimethylol propane, trimethylol ethane, glycerol and pentaerythritol. Examples of suitable polycarboxylic acids and anhydrides include phthalic anhydride, isophthalic acid, adipic acid, azelaic acid, sebacic acid, maleic anhydride or acid and fumaric acid. A lactone such as caprolactone or a hydroxy-acid such as hydroxy-caproic acid or dimethylol propionic acid can be included in the polyester-forming reaction. The hydroxy-functional polyester can be an alkyd polyol containing fatty acid moieties. Another suitable hydroxy-functional polyester can be prepared by reacting an epoxide such as ethylene oxide or a glycidyl ether or ester with a dicarboxylic acid.

Alternative hydroxy-functional polymers containing no amidine or amine groups suitable for use in conjunction with a compound or polymer containing hydroxy groups and at least one amidine group as the hydroxy component (A) include polyether polyols, amide-containing polyols prepared by the reaction of a polycarboxylic acid or anhydride with a polyol and a diamine or amino alcohol, epoxy polyols prepared by the reaction of glycidyl ethers of polyphenols such as the diglycidyl ether of bisphenol A with a bisphenol or an aliphatic diol, polyvinyl alcohol, an allyl alcohol polymer such as a styrene/allyl alcohol copolymer optionally containing allyl ether units, cellulose or a cellulose derivative, or a hydroxy-functional polyurethane.

The hydroxy-functional component (A) can alternatively include a non-polymeric polyol such as ethylene glycol, 1,4-butane diol, neopentyl glycol, 1,4-cyclohexanedimethanol, 2,2-dimethyl-3-hydroxypropyl 2,2-dimethyl-3-hydroxypropionate, diethylene glycol or an alkoxylated bisphenol A.

When the hydroxy-functional component (A) is such a blend the proportions of the blend can be varied within wide limits. For example 2, to 98% by weight of a hydroxy-functional component containing at least one amidine group can be used in conjunction with 98 to 2% by weight of a hydroxy-functional component containing no amidine or amine groups. When the amidine-containing component is a compound or oligomer containing at least two hydroxy-substituted imidazoline groups and the other hydroxy-functional component is a copolymer of a hydroxyalkyl acrylate or methacrylate, the blend preferably contains at least 5% by weight and most preferably 10 to 50% by weight of the amidine-containing component. When the amidine-containing component is a polymer, for example a copolymer of N-vinyl imidazole and a hydroxyalkyl acrylate or methacrylate, a higher proportion of amidine groups is generally used in the polymer if the polymer is to be used in conjunction with a hydroxy-functional component containing no amidine or amine groups.

The amidine groups for catalysing the curing reaction between the hydroxy groups of component (A) and the anhydride groups of component (B) can alternatively be present in a separate compound. Such an amidine compound can for example be an imidazole, imidazoline, pyrimidine, dihydropyrimidine, tetrahydropyrimidine, benzimidazole or benzimidazoline, or an acyclic amidine. The amidine compound can be a compound containing no functional substituents. Imidazole or imidazoline can for example be unsubstituted or can be substituted with one or more alkyl, alkoxyalkyl or acyloxyalkyl groups. Such substituents can for example contain 1 to 20 carbon atoms. 2-substituted imidazolines can be produced by the reaction of a carboxylic acid with ethanediamine or a substituted ethane diamine. Imidazolines containing a long chain, for example of 6 to 20 carbon atoms, in the 2-position, derived from a long-chain fatty acid, may have advantages of compatibility with the other components of the coating compositions. Any eubotituents in the 1-, 4- or 5-positions of the imidazoline ring generally have 1 to 6 carbon atoms.

The amidine compound used as catalyst can alternatively contain a single hydroxy group. It can for example be an imidazole or imidazoline substituted by a hydroxyalkyl group. A hydroxyalkyl-substituted imidazoline can for example have the formula:

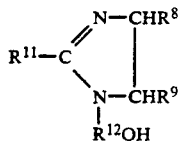

in which $R^{11}$ is an alkyl, alkenyl, alkoxyalkyl or acyloxyalkyl radical containing for example up to 20 carbon atoms and $R^{12}$ is a divalent alkylene radical containing for example up to 20 carbon atoms and optionally containing one or more ether, ester or amide linkages. Such a hydroxy-substituted imidazoline can for example be prepared by reacting a carboxylic acid of the formula $R^{11}COOH$ with a substituted ethane diamine of the formula $H_2N-CHR^8-CHR^9-NHR^{12}OH$ such as N-hydroxyethyl ethane diamine.

The amidine compound used as catalyst can alternatively have a hydroxy group bonded directly to a nitrogen atom or to the carbon atom between the two nitrogen atoms of the amidine group. The amidine compound can for example be a 1-hydroxyimidazoline which can optionally be substituted, for example by an alkyl group in the 2-position, 1-hydroxyimidazole, 1-hydroxybenzimidazole, 2-hydroxyimidazoline or 2-hydroxybenzimidazole.

When a separate amidine compound is used as catalyst, it is preferably used at 0.1 to 5% by weight based on the total weight of hydroxy-functional component (A) and anhydride-functional component (B).

The coating composition may contain a metal compound capable of forming a co-ordination complex with the amidine groups. The metal compound is preferably packaged with the amidine-containing material and is preferably dissolved in an organic solvent. The metal compound can for example be an organic solvent-soluble salt of a divalent transition metal, for example a carboxylate of zinc, copper, iron, cobalt, nickel or chromium. Examples are copper naphthenate, zinc naphthenate, zinc acetoacetate, ferrous octoate, zinc octoate, cobalt naphthenate or zinc, ferrous or copper rosinate. The metal compound increases the pot life of the coating composition after mixing of components (A) and (B) while still allowing thorough curing of the coating on the substrate. The metal compound is preferably used at a molar ratio of no more than one metal atom per amidine group.

The coating composition can alternatively contain a weak organic acid, for example an alkanoic acid such as acetic acid, to increase the pot life of the coating composition. The acid can be used at a molar ratio of acid groups to amidine groups of 0.1:1 to 5:1.

The anhydride-functional component (B) is preferably an addition polymer of an unsaturated cyclic anhydride, for example maleic, itaconic or citraconic anhydride. The anhydride-functional polymer is usually a copolymer with one or more ethylenically unsaturated comonomers. Preferred copolymers contain 10 to 50% by weight maleic or itaconic anhydride units. The anhydride-functional polymer may contain a vinyl comonomer such as styrene or a substituted styrene, vinyl chloride or vinyl acetate. If the coating is to be used as a decorative top coat it may be preferred to use such a vinyl comonomer at a molar ratio of at least 1:1 to the anhydride monomer as described in U.S. Pat. No. 4,798,745. The anhydride-functional polymer preferably contains units of one or more esters of acrylic or methacrylic acid, for example butyl acrylate or methacrylate, methyl methacrylate or acrylate, ethyl acrylate or methacrylate, or propyl, n-hexyl, isopropyl, t-butyl, 2-ethyl-hexyl, cyclohexyl, 2,2,5-trimethylcyclohexyl or isobornyl acrylate or methacrylate. The anhydride-functional polymer may contain a small proportion, for example 1 to 10% by weight, of units of an ethylenically unsaturated carboxylic acid, for example acrylic or methacrylic acid, to promote compatibility with the hydroxy-functional component (A). The molecular weight of the anhydride-functional polymer is preferably in the range 1,000 to 50,000.

The anhydride component (B) can alternatively be an anhydride adduct of a diene polymer such as maleinised polybutadiene or a maleinised copolymer of butadiene, for example a butadiene/styrene copolymer. An anhydride adduct of an unsaturated fatty acid ester, for example a styrene/allyl alcohol copolymer esterified with an unsaturated fatty acid and maleinised, can also be used. Terpene/maleic anhydride copolymer resins are a further alternative.

Alternative anhydride-containing polymers can be formed from hydroxy-containing polymers, for example copolymers of hydroxyethyl acrylate or hydroxyethyl methacrylate or styrene/allyl alcohol copolymers, by reaction with a tricarboxylic compound capable of introducing anhydride groups, for example as described in European Patent Application 259172. A further alternative type of polymer containing anhydride groups is an adduct of trimellitic anhydride and a polyol, for example as described in European Patent Application 134691. The polymer containing anhydride groups can alternatively be formed by the reaction of a polymer containing thiol groups with an olefinically unsaturated cyclic carboxylic acid anhydride such as maleic anhydride or itaconic anhydride. The polymer containing thiol groups is preferably thiol-tipped; it can for example be a multi-limbed telechelic polymer formed by reaction of a corresponding hydroxy-tipped polymer with mercaptoacetic acid.

The amounts of hydroxy-functional component (A) and anhydride-functional component (B) in the coating composition of the invention are preferably such as to provide a ratio of equivalents of hydroxy groups to equivalents of anhydride groups in the range 1:3 to 3:1, most preferably 1:1.2 to 1.2:1.

The coating composition of the invention is preferably an organic solvent-based composition. The solvent is chosen so that the hydroxy-functional component (A) and the anhydride-functional component (B) are soluble to the desired extent and are compatible with one another in solution. Organic solvents which can be used are, for example, aromatic hydrocarbons such as xylene, toluene or trimethyl benzene, ketones such as methyl isobutyl ketone or methyl isoamyl ketone and esters such as butyl acetate, ethoxyethyl acetate or methoxypropyl acetate, and mixtures thereof.

The coating composition of the invention is generally a two-pack coating in which the hydroxy-functional component (A) and the anhydride-functional component (B) are stored separately and are mixed shortly before use. When the amidine groups for catalysing the curing reaction between the hydroxy groups of component (A) and the anhydride groups of component (B) are present as a separate amidine compound, the amidine compound is preferably packaged with the hydroxy-functional component (A). It may alternatively be possible to package a hydroxy-functional component (A) containing no amidine or amine groups and the anhydride component (B) together, with the amidine catalyst being packaged separately, but this is not generally preferred. The coating can be applied to a substrate by spray, for example conventional airless spray or twin-feed spray in which the polymers (A) and (B) are not mixed until the spray head, or by roller or brush.

The coating composition can contain one or more additional ingredients, for example one or more pigments which can be opaque or translucent pigments or metallic flake pigments, fillers, plasticisers, antioxidants, UV stabilisers, surfactants or flow control agents, including additives for imparting thixotropy or sag resistance or pigment orientation. In two-pack compositions where the hydroxy-functional component (A) is a film-forming polymer such additional ingredients are preferably included in the hydroxy polymer component of the paint.

The coating composition is preferably an ambient-temperature-curing coating capable of curing on the substrate within 24 hours at ambient temperature, for example 10°-40° C., to a hard film which is tack-free and resistant to solvent so that it can be overcoated. Maximum hardness, solvent-resistance and impact-resistance generally develop over a number of days at ambient temperature, for example 5-20 days. Curing can be carried out at temperatures above ambient, for example in the range 40°-180° C., particularly 100°-150° C., for shorter times if this is more convenient, for example when coating under factory conditions.

The coating composition of the invention can be applied to a wide variety of substrates, particularly to rigid substrates such as metal, wood, glass or plastics. The compositions can be applied over most commercially sold primers. They can be applied by spray, which is generally preferred, brush or roller or by dipping or flow coating. The coating compositions of the invention are widely useful as top coat paints and are particularly useful as automotive paints, including paints for vehicle refinishing. They can be applied in "clear on base" coating systems in which a pigmented coat is overcoated with a transparent clear coat. The coating compositions of the invention can be used as either the base coat or the clear coat in such coating systems or preferably as both. They can also be applied as clear coats over known base coats such as polyurethane, acrylic or polyester base coats.

The invention is illustrated by the following Examples, in which percentages are by weight.

EXAMPLE 1

Preparation of Anhydride Copolymer 650 g styrene, 150 g methyl methacrylate, 200 g itaconic anhydride, 50 g methacrylic acid and 40 g azo bis-2,2'(2-methylbutyronitrile) ("Vazo 67"—Trade Mark) initiator were mixed and run into refluxing butyl acetate (1,000 g) over 4 hours. When addition was complete, reflux was maintained for a further 2 hours to provide a polymer solution of solids content 55% by weight, anhydride equivalent weight 560 and number average molecular weight Mn 4,500.

Preparation of Hydroxy-Functional Material Containing Imidazoline Groups

"Pripol 1009" (a hydrogenated dimerised fatty acid from Unichema International) (283 g, 1 mole), N-(2-hydroxyethyl) ethanediamine (104 g, 2 moles) and xylene (200 g) were heated together under azeotropic reflux until 36 g (2 moles) of water had been removed (8 hours). The xylene was removed under vacuum to leave a viscous yellow oil of molecular weight 351, and hydroxy equivalent 175. This was a polymer tipped with 2-(1-(2-hydroxyethyl)) imidazoline groups. It was reduced to 40% solids with tetrahydrofuran.

Preparation of Coating Composition 101.8 g of the anhydride copolymer solution was mixed with 43.9 g of the hydroxyethyl-imidazoline material solution produced above. The resulting coating composition was coated on a glass panel and left to cure at ambient temperature (about 20° C.). A hard, tack-free film was produced within 16 hours. The solvent resistance of the film was tested after 7 days by rubbing back and forth with a cloth soaked in methyl ethyl ketone (MEK). The film survived 200 MEK double rubs.

The humidity resistance of the coating was tested by storing a coated panel in an atmosphere of 30° C. and 100% relative humidity for 70 days. The degree of crosslinking of the coating was measured by extraction with MEK. Only 3% of the weight of the coating was extracted by MEK (indicating a low level of uncured or hydrolysed material). This is the same result as was obtained by extraction of an apparently fully cured film which had not been subjected to the humid atmosphere, indicating the resistance of the coating to hydrolysis.

EXAMPLES 2 TO 4

Preparation of Hydroxy-Functional Material Containing Imidazoline Groups

Example 2

Diethylenetriamine (103 g, 1 mole), caprolactone (228 g, 2 moles) and xylene (50 g) were azeotroped until 18 g (1 mole) of water had been removed (17 hours). A golden viscous oil was obtained by vacuum distillation. This consisted substantially of the product having the structure:

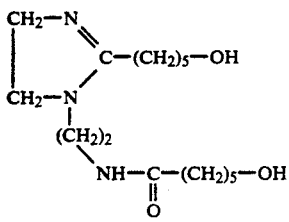

molecular weight=313, hydroxy equivalent weight=157. It was reduced to 60% solids in 1:1 N-methylpyrrolidone xylene.

EXAMPLE 3

N-(beta-hydroxyethyl)ethanediamine (104 g, 1 mole) was heated with caprolactone (114 g, 1 mole) and xylene under azeotropic reflux conditions until 18 g (1 mole) of water had been removed (10 hours). The product had the following structure:

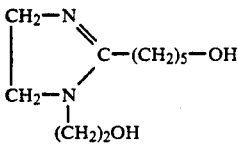

molecular weight=200, hydroxy equivalent weight=100. It was obtained as a 70% solution.

EXAMPLE 4

The product of Example 3 (600 g, 3 moles) was heated in the presence of dibutyltin laurate (1 g) with a preformed radiate polymer, being the reaction product of trimethylolpropane (134 g, 1 mole), caprolactone (684 g, 6 moles) and dimethyl cyclohexanedicarboxylate (600 g, 3 moles), until 96 g (3 moles) of methanol were distilled off.

The product was a viscous liquid of molecular weight 1826, hydroxy equivalent weight 608. It contained three beta-(1-(2-(5-hydroxy pentyl)) imidazolinyl)ethyl residues.

Preparation of Coating Compositions

Coating compositions were produced by mixing 101.8 g of an anhydride copolymer solution of Example 1 with the following amounts of the hydroxy-imidazoline solutions of Examples 2 to 4

| Example No. | Wt of solution used |
|---|---|
| 2 | 26.1 g |
| 3 | 14.2 g |
| 4 | 60.9 g |

In all cases the coating compositions produced were coated on glass panels and allowed to cure at ambient temperature. The cured coatings were all resistant to 150 MEK double rubs after 24 hours' curing at ambient temperature.

EXAMPLE 5

339.6 g "Pripol 1009" hydrogenated dimer fatty acid, 25.8 g piperazine and 269 g xylene were heated at reflux for 5 hours with azeotropic distillation to remove water. The product was a 59% solution of a carboxylic acid-tipped polyamide having an acid value (of the solution) of 98.

500 g of the product solution and 53.6 g N-hydroxyethyl ethane diamine were heated at reflux for 4 hours with azeotropic distillation of water. The product was a solution of a polyamide tipped with 1-hydroxyethylimidazolin-2-yl groups.

4.46 g of the product solution was mixed with 4.32 g of the anhydride polymer solution of Example 1, 3 g xylene and 0.5 g acetic acid. The resulting coating composition was applied to a panel and allowed to cure as described in Example 1. After 7 days the film survived over 100 MEK double rubs.

EXAMPLES 6 and 7

Following the procedure of Example 5, carboxylic acid-tipped polyamides were prepared from the following proportions of reagents to produce polyamide solution having the stated acid values.

| | Pripol 1009 | Piperazine | Xylene | Product solution % Solids | Product solution Acid Value |
|---|---|---|---|---|---|
| Example 6 | 339.7 g | 34.5 g | 301 g | 60 | 67 |
| Example 7 | 377.3 g | 43.1 g | 301 g | 62 | 50 |

The polyamide solutions were reacted with N-hydroxyethyl ethane diamine (HEED) as described in Example 5 but using the proportions shown below to produce polyamides tipped with 1-hydroxyethylimidazolin-2-yl groups.

| | Polyamide Solution | HEED |
|---|---|---|
| Example 6 | 400 g | 29.8 g |
| Example 7 | 500 g | 28.5 g |

The resulting polymer solutions were each mixed with 2.88 g of the anhydride polymer solution of Example 1, 3 g xylene and 0.5 g acetic acid and were each applied as a coating and allowed to cure as described in Example 1. After 7 days the film of Example 6 survived over 95 MEK double rubs and that of Example 7 survived over 80 MEK double rubs.

EXAMPLE 8

12.0 g N-vinyl imidazole, 29.0 g hydroxyethyl acrylate, 54.5 g methyl methacrylate, 54.5 g styrene and 6.0 g "Vazo 67" initiator were mixed. This monomer mixture was added over 3 hours to 151 g refluxing butyl acetate, and heating to reflux was continued for a further 2 hours. The product was a 50% solution of a copolymer containing hydroxy and imidazole groups and having an amine equivalent weight of 1180.

4.84 g of this copolymer solution was mixed with 1.73 g of the anhydride polymer solution of Example 1 to form a coating composition. The coating was applied to glass panels and allowed to cure as described in Example 1. The cured coating survived 80 MEK double rubs.

EXAMPLE 9

3.39 g of the N-vinyl imidazole/hydroxyethyl acrylate copolymer solution of Example 8 was mixed with 0.27 g of a polyester formed by reacting epsilon-caprolactone and trimethylolpropane. The resulting mixture was used as the hydroxy-functional component of a coating composition and was mixed with 1.73 g of the anhydride polymer solution of Example 1. The resulting composition was applied to panels and allowed to cure as described in Example 1. The cured coating survived 200 MEK double rubs and gave a particularly clear coating film.

EXAMPLE 10

"Pripol 1009" hydrogenated dimer fatty acid and N-hydroxyethyl ethane diamine were reacted as described in Example 1. To a solution of 47.9 g reaction product solids in 56.6 g xylene heated to reflux 15.56 g epsilon-caprolactone and 0.11 g dibutyl tin dilaurate were added over 1 hour. The solution was heated at reflux for a further 5.5 hours. The product was a 54% solids solution of the hydrogenated dimer fatty acid tipped with 2-imidazolinyl groups substituted in the 1-position by caprolactone-extended hydroxyethyl groups.

A 55% solids anhydride copolymer solution was prepared by the process of Example 1, but replacing 4 g of the itaconic anhydride by an equivalent amount of itaconic acid.

4.29 g of the polymer solution containing substituted imidazoline groups was mixed with 4.86 g of the anhydride copolymer solution to form a coating composition which was applied to panels and allowed to cure as described in Example 1. The cured coating survived 200 MEK double rubs.

EXAMPLES 11 and 12

An anhydride copolymer was prepared by copolymerising 22.6% by weight maleic anhydride with methyl methacrylate, butyl acrylate and styrene using the procedure of Example 1 to form a 40% copolymer solution in butyl acetate.

A hydroxy-functional copolymer was prepared by solution copolymerisation of 14.0% by weight hydroxyethyl acrylate with styrene, methyl methacrylate and butyl acrylate using azobisisobutyronitrile initiator in a mixture of xylene and methoxypropyl acetate to produce a 62% copolymer solution.

50.0 g of the hydroxy-functional copolymer solution was mixed with 42.0 g of the anhydride copolymer solution. The resulting coating composition was applied to panels, allowed to cure and tested as described in Example 1.

| Catalyst | | MEK Double Rub Resistance of Coating |
| --- | --- | --- |
| Example 11 | 0.36 g imidazole | 100 |
| Example 12 | 0.83 g beta-hydroxy | 75 |

| Catalyst | MEK Double Rub Resistance of Coating |
| --- | --- |
| ethylimidazoline | |

EXAMPLES 13 to 15

The hydroxy-functional copolymer solution of Examples 11 and 12 was mixed in varying proportions with the polyamide tipped with 1-hydroxyethylimidazolin-2-yl groups produced in Example 5 to form a hydroxy-functional component comprising both amidine-containing and amidine-free materials. This hydroxy-functional component was mixed with 21.45 g of the anhydride copolymer solution of Examples 11 and 12 and 15.8 g xylene to produce a coating composition. The coating composition was applied to panels and allowed to cure as described in Example 1, and the coatings of Examples 13 and 14 were tested for resistance to rubbing with MEK or with xylene. The results are shown below.

| | Hydroxy-functional Copolymer Solution | Imidazoline-functional Polyamide | MEK double rub resistance | Xylene double rub resistance |
| --- | --- | --- | --- | --- |
| Example 13 | 23.36 g | 1.65 g | 70 | 130 |
| Example 14 | 20.76 g | 3.29 g | 95 | over 200 |
| Example 15 | 12.98 g | 8.23 g | | |

I claim:

1. A coating composition comprising (A) a hydroxy-functional component having at least two hydroxy groups per molecule and (B) an anhydride-functional component having at least two carboxylic acid anhydride groups per molecule, at least one of the components (A) and (B) being a film-forming polymer, wherein the hydroxy-functional component (A) comprises a polymer or compound containing within its molecule at least two hydroxyalkyl-substituted imidazoline groups for accelerating the curing reaction between the hydroxy groups of component (A) and the anhydride groups of component (B).

2. A coating composition according to claim 1, wherein the hydroxy-functional component (A) has the formula:

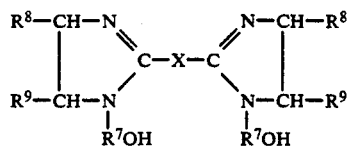

in which $R^7$ represents a divalent organic group attached through carbon atoms, $R^8$ and $R^9$, which may be the same or different, represent hydrogen or a lower alkyl group and X represents an alkylene chain of at least 4 carbon atoms optionally containing an ether, ester, amide or arylene linkage.

3. A coating composition according to claim 1, wherein the hydroxy-functional component (A) is a polyester, polyether, polyamide, acrylic polymer, diene polymer or polyisobutylene containing at least two groups of the formula:

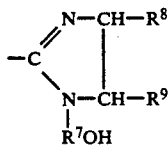

in which R⁷ represents a divalent organic group attached through carbon atoms, and R⁸ and R⁹, which may be the same or different, represent hydrogen or a lower alkyl group.

4. A coating composition according to claim 1, wherein the hydroxy-functional component (A) contains at least two groups of the formula:

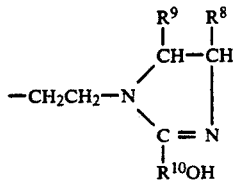

in which R⁸ and R⁹, which may be the same or different, represent hydrogen or a lower alkyl group, and R¹⁰ represents a divalent organic group.

5. A coating composition comprising (A) a hydroxy-functional component having at least two hydroxy groups per molecule and (B) an anhydride-functional component having at least two carboxylic acid anhydride groups per molecule, component (B) being a film-forming polymer, wherein the hydroxy-functional component (A) is a dihydroxyimidazoline of the formula:

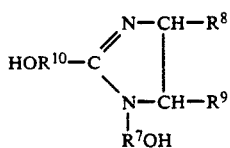

in which R⁷ represents a divalent organic group attached through carbon atoms, R⁸ and R⁹, which may be the same or different, represent hydrogen or a lower alkyl group, and R¹⁰ represents a divalent organic group.

6. A coating composition according to claim 1, wherein the hydroxy-functional component (A) is a blend of a polymer or compound containing at least two hydroalkyl-substituted imidazoline groups and a hydroxy-functional component containing no amidine or amine groups.

7. A coating composition according to claim 1, wherein the anhydride-functional component (B) is an addition polymer of an unsaturated cyclic carboxylic acid anhydride.

8. A coating composition according to claim 1, wherein the hydroxy-functional component (A) and anhydride-functional component (B) are packaged separately for mixture shortly before application to a substrate.

9. A coating composition according to claim 5, wherein the hydroxy group attached to the R⁷ group is in the beta-position with respect to the 1-nitrogen of the imidazoline ring.

10. A coating composition comprising (A) a hydroxy-functional component having at least two hydroxy groups per molecule and (B) an anhydride-functional component having at least two carboxylic acid anhydride groups per molecule, at least one of the components (A) and (B) being a film-forming polymer, characterized in that the coating composition contains as catalyst for accelerating the curing reaction between the hydroxy groups of component (A) and the anhydride groups of component (B), an amidine compound containing a single hydroxy group.

11. A coating composition according to claim 10, wherein the amidine compound is an imidazole containing a single hydroxy group.

12. A coating composition according to claim 10 wherein the amidine compound is an imidazoline containing a single hydroxy group.

13. A coating composition according to claim 10 wherein the amidine compound is a hydroxyalkyl-substituted imidazoline of the formula:

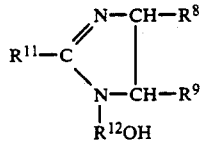

in which R⁸ and R⁹, which may be the same or different, represent hydrogen or a lower alkyl group, R¹¹ is an alkyl, alkenyl, alkoxyalkyl or acyloxyalkyl radical and R¹² is a divalent alkylene radical which may optionally contain one or more ether, ester or amide linkages.

14. A coating composition according to claim 10, wherein the anhydride-functional component (B) is an addition polymer of an unsaturated cyclic carboxylic acid annydride.

* * * * *